United States Patent
Iyer et al.

(10) Patent No.: US 11,836,507 B2
(45) Date of Patent: Dec. 5, 2023

(54) PRIORITIZING THE PRE-LOADING OF APPLICATIONS WITH A CONSTRAINED MEMORY BUDGET USING CONTEXTUAL INFORMATION

(71) Applicant: Dell Products, L.P., Round Rock, TX (US)

(72) Inventors: Vivek Viswanathan Iyer, Austin, TX (US); Michael S. Gatson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 317 days.

(21) Appl. No.: 16/905,589

(22) Filed: Jun. 18, 2020

(65) Prior Publication Data

US 2021/0397461 A1 Dec. 23, 2021

(51) Int. Cl.
*G06F 9/445* (2018.01)
*G06F 9/50* (2006.01)
*G06F 12/0862* (2016.01)

(52) U.S. Cl.
CPC .......... *G06F 9/44521* (2013.01); *G06F 9/445* (2013.01); *G06F 9/5016* (2013.01); *G06F 12/0862* (2013.01); *G06F 9/44505* (2013.01); *G06F 2212/602* (2013.01)

(58) Field of Classification Search
None
See application file for complete search history.

(56) References Cited

U.S. PATENT DOCUMENTS

| | | | | |
|---|---|---|---|---|
| 10,824,339 | B1 * | 11/2020 | Brooker | G06F 3/0664 |
| 2005/0262505 | A1 * | 11/2005 | Esfahany | G06F 9/5077 718/1 |
| 2007/0245028 | A1 * | 10/2007 | Baxter | H04L 67/56 709/228 |
| 2008/0319910 | A1 * | 12/2008 | Duffus | G06F 21/123 705/52 |
| 2010/0031366 | A1 * | 2/2010 | Knight | H04L 51/212 709/219 |
| 2010/0199043 | A1 * | 8/2010 | Sechrest | G06F 12/122 711/E12.001 |
| 2013/0238751 | A1 * | 9/2013 | Raleigh | H04L 67/562 709/217 |
| 2014/0040343 | A1 * | 2/2014 | Nickolov | H04L 69/32 709/201 |
| 2014/0372723 | A1 * | 12/2014 | Bobroff | G06F 11/3433 711/170 |

(Continued)

*Primary Examiner* — Abu Zar Ghaffari
(74) *Attorney, Agent, or Firm* — Fogarty LLP

(57) ABSTRACT

Systems and methods for pre-loading applications with a constrained memory budget and prioritizing the applications based on contextual information are described. An Information Handling System (IHS) may include a processor and a memory coupled to the processor, the memory having program instructions stored thereon that, upon execution by the processor, cause the IHS to: collect user context information and system context information, detect a triggering event based upon the user context information and the system context information, identify a memory budget for pre-loading one or more applications, and select the one or more applications with one or more settings configured to maintain a memory usage for the pre-loading below the memory budget.

19 Claims, 3 Drawing Sheets

(56) References Cited

U.S. PATENT DOCUMENTS

| | | | | |
|---|---|---|---|---|
| 2015/0293701 A1* | 10/2015 | Kim | ................ | G06F 3/0673 |
| | | | | 711/159 |
| 2015/0324137 A1* | 11/2015 | Wu | ................ | G06F 12/08 |
| | | | | 713/2 |
| 2016/0364272 A1* | 12/2016 | Hou | ................ | G06F 9/5038 |
| 2018/0047058 A1* | 2/2018 | Kang | ................ | G06F 3/0485 |
| 2018/0167446 A1* | 6/2018 | Lewis | ................ | H04L 47/83 |
| 2018/0239624 A1* | 8/2018 | Tsirkin | ................ | G06F 9/445 |
| 2018/0300067 A1* | 10/2018 | Mittal | ................ | G06F 3/0631 |
| 2018/0365036 A1* | 12/2018 | Toal | ................ | G06F 9/44578 |
| 2020/0218573 A1* | 7/2020 | Sun | ................ | G06F 9/5016 |
| 2020/0379810 A1* | 12/2020 | Dalmia | ................ | G06F 9/5022 |
| 2021/0303582 A1* | 9/2021 | Boaz Costa Leite | ..... | G06F 7/14 |

\* cited by examiner

PRIORITIZING THE PRE-LOADING OF APPLICATIONS WITH A CONSTRAINED MEMORY BUDGET USING CONTEXTUAL INFORMATION

FIELD

The present disclosure relates generally to Information Handling Systems (IHSs), and more particularly, to systems and methods for prioritizing the pre-loading of applications with a constrained memory budget using contextual information.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS can execute many different types of applications. In that regard, the inventors hereof have recognized that if an IHS were able to anticipate or predict its user's intent, the IHS could then be configured to facilitate subsequent tasks based on the pre-loading of relevant applications, with selected settings, in a constrained memory environment.

SUMMARY

Embodiments of systems and methods for prioritizing the pre-loading of applications with a constrained memory budget using contextual information are described. In an illustrative, non-limiting embodiment, an Information Handling System (IHS) may include a processor and a memory coupled to the processor, the memory having program instructions stored thereon that, upon execution by the processor, cause the IHS to: collect user context information and system context information, detect a triggering event based upon the user context information and the system context information, identify a memory budget for pre-loading one or more applications, and select the one or more applications with one or more settings configured to maintain a memory usage for the pre-loading below the memory budget For example, user context information may include at least one of: an identity of a user, a time-of-day, a calendar event, a type of calendar event, an application currently under execution, a duration of execution of an application, a mode of execution of an application, a user's proximity to the IHS, or a user's gaze direction. Additionally, or alternatively, system context information may include at least one of: a current location of the IHS, a current memory usage, a characteristic of a current network connection, a current power usage, an identification of a currently connected peripheral device, or a current IHS posture.

In some cases, the memory budget may indicate a percentage of total available memory manually selected by a user for the pre-loading. The memory budget may indicate a percentage of total available memory automatically selected for the pre-loading, at least in part, based upon historical user context information and system context information. Additionally, or alternatively, the memory budget may be automatically selected based upon the triggering event.

To select the one or more applications, the program instructions, upon execution, may cause the IHS to: transmit the user context information and the system context information to a remote server configured to rank applications by priority, at least in part, based upon historical context information and system context information; and receive a ranking of the applications from the remote server. Additionally, or alternatively, to select the one or more applications, the program instructions, upon execution, may cause the IHS to: select a first highest ranked application having a first associated setting, a first responsiveness score, and a first memory utilization; and in response to a total memory utilization satisfying the memory budget, select a second highest ranked application having a second associated setting, a second responsiveness score, and a second memory utilization.

For example, at least one of the first or second associated settings may include an online mode or an offline mode. At least one of the first or second responsiveness scores may include a metric inversely proportional to a time it takes to load the first or second highest application with the first or second associated setting, respectively. At least one of the first or second memory utilization may include an amount of memory that it takes to load the first or second highest application with the first or second associated setting, respectively. Moreover, the program instructions, upon execution, may further cause the IHS to pre-load the one or more applications into a cache memory.

In another illustrative, non-limiting embodiment, a memory storage device may have program instructions stored thereon that, upon execution by one or more processors of an IHS, cause the IHS to: collect user context information and system context information; detect a triggering event based upon the user context information and the system context information; identify a memory budget for pre-loading one or more applications; and select the one or more applications with one or more settings configured to maintain a memory usage for the pre-loading below the memory budget.

In yet another illustrative, non-limiting embodiment, a method may include: collecting user context information and system context information; detecting a triggering event based upon the user context information and the system context information; identifying a memory budget for pre-loading one or more applications; and selecting the one or more applications with one or more settings configured to maintain a memory usage for the pre-loading below the memory budget.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Systems and methods are described for prioritizing the pre-loading of applications with a constrained memory budget using contextual information. In some embodiments, these systems and methods may make users more productive by predicting or anticipating their intent with a high degree of accuracy and reducing friction for accomplishing certain tasks based on the prediction. Moreover, systems and methods described here may involve the creation and application of rules by an Information Handling System (IHS) and the production of inferences through context information such as on-box telemetry, user data, environmental data, user behavior, and/or other inputs including, but not limited to text, voice, gesture, facial, and/or gaze tracking. In some cases, machine learning (ML) algorithms may be trained using contextual data sets collected through the IHS.

For example, in some cases, it may be desirable to identify and preload selected applications (e.g., web browser tabs, Universal Windows Platform (UWP) applications, Win32/64 applications, etc.) frequently used by a user for an upcoming activity that has been learned, within a constrained memory budget. As used herein, the term "constrained memory budget" refers to a maximum portion or percentage of memory that a user (or information technology decision maker or "ITDM") wants to be used for increasing IHS responsiveness by preloading applications, browser tabs, etc. (versus the remaining portion or percentage of memory kept available for spontaneous usage).

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
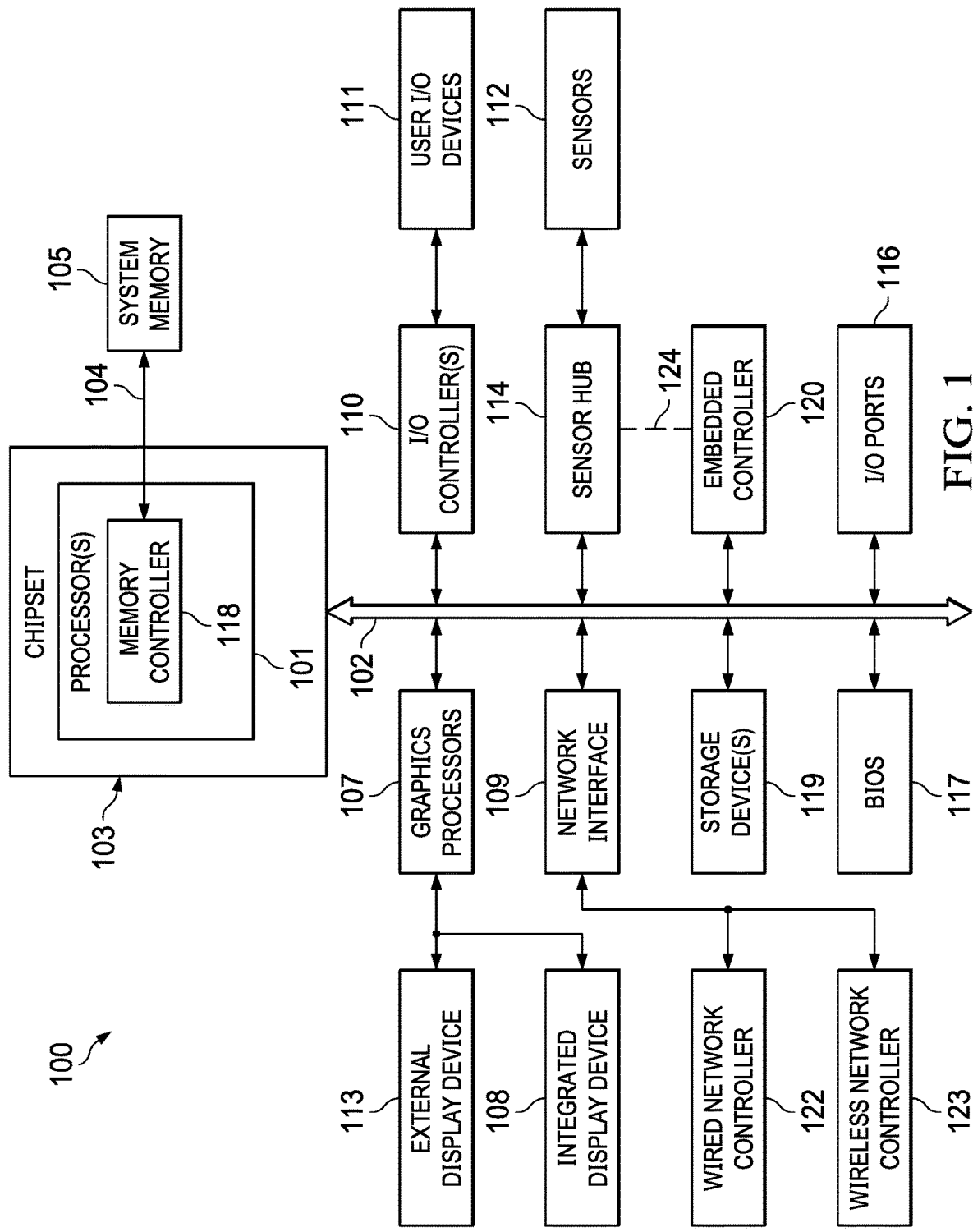
FIG. 1 is a block diagram of an example of an Information Handling System (IHS) configured to prioritize the pre-loading of applications with a constrained memory budget using contextual information, according to some embodiments.

FIG. 1 is a block diagram illustrating components of IHS 100 configured to prioritize the pre-loading of applications with a constrained memory budget using contextual information. As shown, IHS 100 includes one or more processors 101, such as a Central Processing Unit (CPU), that execute code retrieved from system memory 105. Although IHS 100 is illustrated with a single processor 101, other embodiments may include two or more processors, that may each be configured identically, or to provide specialized processing operations. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor 101 includes an integrated memory controller 118 that may be implemented directly within the circuitry of processor 101, or memory controller 118 may be a separate integrated circuit that is located on the same die as processor 101. Memory controller 118 may be configured to manage the transfer of data to and from the system memory 105 of IHS 100 via high-speed memory interface 104. System memory 105 that is coupled to processor 101 provides processor 101 with a high-speed memory that may be used in the execution of computer program instructions by processor 101.

Accordingly, system memory 105 may include memory components, such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, system memory 105 may include multiple removable memory modules.

IHS 100 utilizes chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides processor(s) 101 with access to a variety of resources accessible via bus 102. In IHS 100, bus 102 is illustrated as a single element. Various embodiments may utilize any number of separate buses to provide the illustrated pathways served by bus 102.

In various embodiments, IHS 100 may include one or more I/O ports 116 that may support removeable couplings with various types of external devices and systems, including removeable couplings with peripheral devices that may be configured for operation by a particular user of IHS 100. For instance, I/O 116 ports may include USB (Universal Serial Bus) ports, by which a variety of external devices may be coupled to IHS 100. In addition to or instead of USB ports, I/O ports 116 may include various types of physical I/O ports that are accessible to a user via the enclosure of the IHS 100.

In certain embodiments, chipset 103 may additionally utilize one or more I/O controllers 110 that may each support the operation of hardware components such as user I/O devices 111 that may include peripheral components that are physically coupled to I/O port 116 and/or peripheral components that are wirelessly coupled to IHS 100 via network interface 109. In various implementations, I/O controller 110 may support the operation of one or more user I/O devices 110 such as a keyboard, mouse, touchpad, touchscreen, microphone, speakers, camera and other input and output devices that may be coupled to IHS 100. User I/O devices 111 may interface with an I/O controller 110 through wired or wireless couplings supported by IHS 100. In some cases, I/O controllers 110 may support configurable operation of supported peripheral devices, such as user I/O devices 111.

As illustrated, a variety of additional resources may be coupled to processor(s) 101 of IHS 100 through chipset 103. For instance, chipset 103 may be coupled to network interface 109 that may support different types of network connectivity. IHS 100 may also include one or more Network Interface Controllers (NICs) 122 and 123, each of which may implement the hardware required for communicating via a specific networking technology, such as Wi-Fi, BLUETOOTH, Ethernet and mobile cellular networks (e.g., CDMA, TDMA, LTE). Network interface 109 may support network connections by wired network controllers 122 and wireless network controllers 123. Each network controller 122 and 123 may be coupled via various buses to chipset 103 to support different types of network connectivity, such as the network connectivity utilized by IHS 100.

Chipset 103 may also provide access to one or more display device(s) 108 and/or 113 via graphics processor 107. Graphics processor 107 may be included within a video card, graphics card or within an embedded controller installed within IHS 100. Additionally, or alternatively, graphics processor 107 may be integrated within processor 101, such as a component of a system-on-chip (SoC). Graphics processor 107 may generate display information and provide the generated information to one or more display device(s) 108 and/or 113, coupled to IHS 100.

One or more display devices 108 and/or 113 coupled to IHS 100 may utilize LCD, LED, OLED, or other display technologies. Each display device 108 and 113 may be capable of receiving touch inputs such as via a touch controller that may be an embedded component of the display device 108 and/or 113 or graphics processor 107, or it may be a separate component of IHS 100 accessed via bus 102. In some cases, power to graphics processor 107, integrated display device 108 and/or external display 133 may be turned off or configured to operate at minimal power levels in response to IHS 100 entering a low-power state (e.g., standby).

As illustrated, IHS 100 may support an integrated display device 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to external I/O port 116 of the IHS 100. In certain scenarios, the operation of integrated displays 108 and external displays 113 may be configured for a particular user. For instance, a particular user may prefer specific brightness settings that may vary the display brightness based on time of day and ambient lighting conditions.

Chipset 103 also provides processor 101 with access to one or more storage devices 119. In various embodiments, storage device 119 may be integral to IHS 100 or may be external to IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud system or enterprise data management system that is accessible via network interface 109.

As illustrated, IHS 100 also includes Basic Input/Output System (BIOS) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. BIOS 117 instructions may also load an operating system (OS) (e.g., WINDOWS, MACOS, iOS, ANDROID, LINUX, etc.) for use by IHS 100.

BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 100 embodiments may utilize sensor hub 114 capable of sampling and/or collecting data from a variety of hardware sensors 112. For instance, sensors 112, may be disposed within IHS 100, and/or display 110, and/or a hinge coupling a display portion to a keyboard portion of IHS 100, and may include, but are not limited to: electric, magnetic, hall effect, radio, optical, infrared, thermal, force, pressure, touch, acoustic, ultrasonic, proximity, position, location, angle, deformation, bending, direction, movement, velocity, rotation, acceleration, bag state (in or out of a bag), and/or lid sensor(s) (open or closed).

In some cases, one or more sensors 112 may be part of a keyboard or other input device. Processor 101 may be configured to process information received from sensors 112 through sensor hub 114, and to perform methods for prioritizing the pre-loading of applications with a constrained memory budget using contextual information obtained from sensors 112.

For instance, during operation of IHS 100, the user may open, close, flip, swivel, or rotate display 108 to produce different IHS postures. In some cases, processor 101 may be configured to determine a current posture of IHS 100 using sensors 112. For example, in a dual-display IHS implementation, when a first display 108 (in a first IHS portion) is folded against a second display 108 (in a second IHS portion) so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait).

For example, in a laptop posture, a first display surface of a first display 108 may be facing the user at an obtuse angle with respect to a second display surface of a second display 108 or a physical keyboard portion. In a tablet posture, a first display 108 may be at a straight angle with respect to a second display 108 or a physical keyboard portion. And, in a book posture, a first display 108 may have its back resting against the back of a second display 108 or a physical keyboard portion.

It should be noted that the aforementioned postures, and their various respective keyboard states, are described for sake of illustration. In different embodiments, other postures may be used, for example, depending upon the type of hinge coupling the displays, the number of displays used, or other accessories.

In other cases, processor 101 may process user presence data received by sensors 112 and may determine, for example, whether an IHS's end-user is present or absent. Moreover, in situations where the end-user is present before IHS 100, processor 101 may further determine a distance of the end-user from IHS 100 continuously or at pre-determined time intervals. The detected or calculated distances may be used by processor 101 to classify the user as being in the IHS's near-field (user's position<threshold distance A), mid-field (threshold distance A<user's position<threshold distance B, where B>A), or far-field (user's position>threshold distance C, where C>B) with respect to IHS 100 and/or display 108.

More generally, in various implementations, processor 101 may receive and/or to produce system context information using sensors 112 including one or more of, for example: a user's presence state (e.g., present, near-field, mid-field, far-field, absent), a facial expression of the user, a direction of the user's gaze, a user's gesture, a user's voice, an IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., holding a stylus, or the like), a time of day, software application(s) under execution in focus for receiving keyboard input, whether IHS 100 is inside or outside of a carrying bag, ambient lighting, a battery charge level, whether IHS 100 is operating from battery power or is plugged into an AC power source (e.g., whether the IHS is operating in AC-only mode, DC-only mode, or AC+DC mode), a power consumption of various components of IHS 100 (e.g., CPU 101, GPU 107, system memory 105, etc.).

In certain embodiments, sensor hub 114 may be an independent microcontroller or other logic unit that is coupled to the motherboard of IHS 100. Sensor hub 114 may be a component of an integrated system-on-chip incorporated into processor 101, and it may communicate with chipset 103 via a bus connection such as an Inter-Integrated Circuit (I²C) bus or other suitable type of bus connection. Sensor hub 114 may also utilize an I²C bus for communicating with various sensors supported by IHS 100.

As illustrated, IHS 100 may utilize embedded controller (EC) 120, which may be a motherboard component of IHS 100 and may include one or more logic units. In certain embodiments, EC 120 may operate from a separate power plane from the main processors 101 and thus the OS operations of IHS 100. Firmware instructions utilized by EC 120 may be used to operate a secure execution system that may include operations for providing various core functions of IHS 100, such as power management, management of operating modes in which IHS 100 may be physically configured and support for certain integrated I/O functions. In some embodiments, EC 120 and sensor hub 114 may communicate via an out-of-band signaling pathway or bus 124.

In various embodiments, IHS 100 may not include each of the components shown in FIG. 1. Additionally, or alternatively, IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as an SoC.

Figure 2:
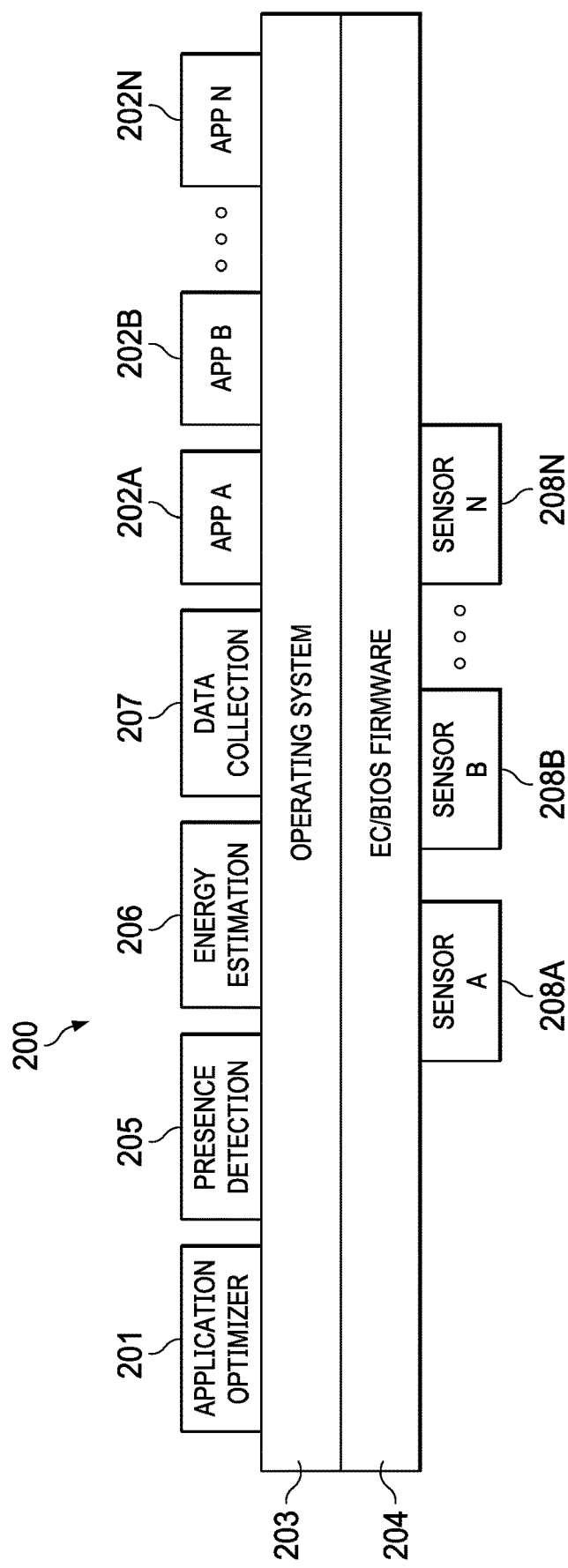
FIG. 2 is a block diagram illustrating an example of a software system configured to prioritize the pre-loading of applications with a constrained memory budget using contextual information, according to some embodiments.

FIG. 2 is a block diagram illustrating an example of software system 200 produced by IHS 100 for prioritizing the pre-loading of applications with a constrained memory budget using contextual information. In some embodiments, each element of software system 200 may be provided by IHS 100 through the execution of program instructions by one or more logic components (e.g., CPU 100, BIOS 117, EC 120, etc.) stored in memory (e.g., system memory 105), storage device(s) 119, and/or firmware 117, 120.

As shown, software system 200 includes application optimizer engine 201 configured to manage the performance optimization of applications 202A-N. An example of application optimizer engine 201 is the DELL PRECISION OPTIMIZER. Meanwhile, examples of applications 202A-N include, but are not limited to, computing resource-intensive applications such as remote conferencing applications, video editors, image editors, sound editors, video games, etc.; as well as less resource-intensive applications, such as media players, web browsers, document processors, email clients, etc.

Both application optimizer engine 201 and applications 202A-N are executed by OS 203, which is in turn supported by EC/BIOS instructions/firmware 204. EC/BIOS firmware 204 is in communications with, and configured to receive data collected by, sensor modules or drivers 208A-N—which may abstract and/or interface with respective ones of sensors 112.

In various embodiments, software system 200 also includes presence detection module or application programming interface (API) 205, energy estimation engine or API 206, and data collection module or API 207 executed above OS 203.

Presence detection module 205 may process user presence data received by one or more of sensor modules 208A-N and it may determine, for example, whether an IHS's end-user is present or absent. Moreover, in cases where the end-user is present before the IHS, presence detection module 205 may further determine a distance of the end-user from the IHS continuously or at pre-determined time intervals. The detected or calculated distances may be used by presence detection module 205 to classify the user as being in the IHS's near-field, mid-field, or far-field.

Energy estimation engine 206 may include, for example, the MICROSOFT E3 engine, which is configured to provide energy usage data broken down by applications, services, tasks, and/or hardware in an IHS. In some cases, energy estimation engine 206 may use software and/or hardware sensors configured to determine, for example, whether any of applications 202A-N are being executed in the foreground or in the background (e.g., minimized, hidden, etc.) of the IHS's graphical user interface (GUI).

Data collection engine 207 may include any data collection service or process, such as, for example, the DELL DATA VAULT configured as a part of the DELL SUPPORT CENTER that collects information on system health, performance, and environment. In some cases, data collection engine 207 may receive and maintain a database or table that includes information related to IHS hardware utilization (e.g., by application, by thread, by hardware resource, etc.), power source (e.g., AC-plus-DC, AC-only, or DC-only), etc.

In operation, application optimizer engine 201 monitors applications 202A-N executing on IHS 100. Particularly, application optimizer engine 201 may gather data associated with the subset of I/O parameters for a predetermined period of time (e.g., 15, 30, 45, 60 minutes or the like). For each of applications 202A-N, the classifier may use the gathered data to characterize the application's workload with various settings, memory usage, responsiveness, etc.

Figure 3:
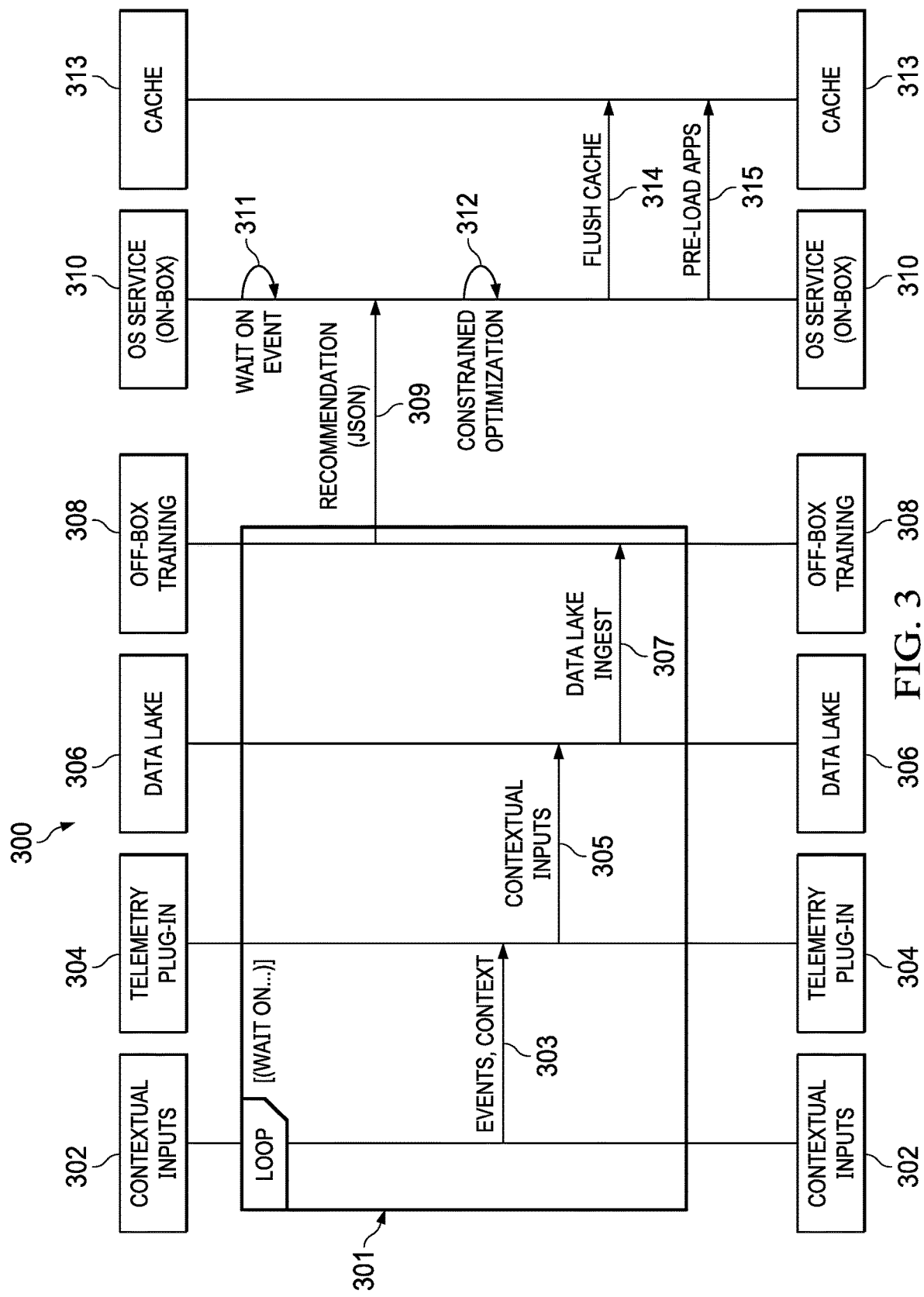
FIG. 3 is a chart illustrating an example of a method for prioritizing the pre-loading of applications with a constrained memory budget using contextual information, according to some embodiments.

FIG. 3 is a flowchart illustrating an example of method 300 for prioritizing the pre-loading of applications with a constrained memory budget using contextual information. In some embodiments, method 300 may be executed, at least in part, by operation of application optimization engine 201. As noted above, application optimizer engine 201 may monitor applications 202A-N executing on IHS 100, gather data for a predetermined period of time, and use the gathered data to characterize and detect one or more triggering events. In various implementations, method 300 may be used to adaptively manage the various characterizations, learning, and/or optimization processes performed by application optimizer engine 201 by ranking applications 202A-N by order of priority—which takes into account information received by presence detection module 205, energy estimation engine 206, and/or data collection module 207.

In some embodiments, method 300 may include collecting user context information and system context information, detecting a triggering event based upon the user context information and the system context information, identifying a memory budget for pre-loading one or more applications, and selecting the one or more applications with one or more settings configured to maintain a memory usage for the pre-loading below the memory budget.

For example, a software service executed by IHS 100 may include: (a) telemetry, calibration, and/or configuration routines, and (b) steady-state data collection and operation routines.

The (a) telemetry, calibration and/or configuration routines, upon execution, may configure IHS 100 to learn and get inputs on most common user and system contexts. In some cases, contextual inputs may be gathered and placed in a repository for training. Examples of contextual inputs include, but are not limited to: platform/sensor input, eye/facial tracking, I/O (keyboard, mouse, stylus, etc.), location, voice/gesture, biometrics, audio, application/OS/user, foreground application, time spent using an application, services/processes, time-of-day, calendar/scheduled events, system hardware settings, environmental inputs, ambient sound, ambient lighting, weather, events, etc.

Particularly, contextual inputs may be classified as "user" or "system" context information. User context information may include, but is not limited to: calendar, time of day, applications/processes, etc. Meanwhile, system context information, may include, but is not limited to: location, user behavior, system settings, attached peripherals, periods of dc runtime operation, and other environmental parameters. In some implementations, the user may manually choose, as part of a calibration procedure, a list of applications to be tracked and/or learned for placement. System context information may be collected using sensors 208A-N, whereas user context information may be collected using presence detection module 205, energy estimation engine 206, and/or data collection module 207.

The (b) steady-state data collection and operation routines, upon execution, may configure IHS 100 to also collect context information, including calendar input, system, user, environment, etc., and use the context information to detect triggering events, and to load configuration parameters. An example of a configuration parameter is a memory budget "M" (e.g., as a percentage of total available memory) that can be manually selected by a user and/or automatically selected (e.g. using an ML algorithm) using historical user and/or system context information.

The steady-state data collection and operation routines, upon execution, may also handle real-time recommendations using context, and outputs an ordered list of applications and selected settings for those applications (e.g., start in online mode, start in offline mode, a number of web browser tabs with different web addresses, etc.). In some cases, application optimizer 201 may be configured to perform ML training and inference I/O parametrization, and to produce data structures any suitable format (e.g., JavaScript Object Notation or JSON schema).

In such a data structure, a series of applications (app1, app2, etc.) may be listed and ranked, by order of priority, each application with associated settings ("knobs"), responsiveness score, and memory utilization, for example, as follows:

{"ordered_list_of_preload_apps": [{app1, knobs_A1_1, responsiveness_score, mem_util}, {app1, knobs_A1_2, responsiveness_score, mem_util}, {app2, knobs_A2_1, responsiveness_score, mem_util}, . . . {appN, knobs_AN_K, responsiveness_score, mem_util}]}.

In this example, application 1 (app1) has a first highest pre-loading priority with A1_1 settings, and the same application has a second highest pre-loading priority with A1_2 settings, application 2 has a third highest pre-loading priority with A2_1 settings, and so on. Responsiveness scores may include any suitable metric (e.g., on a scale from 1 to 10) inversely proportional to the time it takes to load a respective application with an associated knob or setting, respectively. Moreover, the memory utilization may include an amount of memory (e.g., in number of bytes) that it takes to load a respective application with an associated knob or setting.

In some implementations, each such data structure may be associated with a particular triggering event. For instance, in response to IHS 100 determining that a certain set of contextual data matches historical contextual data indicative of a given triggering event (e.g., the user has upcoming calendar meeting during a certain time-of-day from some location, etc.), a corresponding data structure may be retrieved that instructs IHS which applications to pre-load, or predicatively load, and with which knobs or settings, in order to increase the user's productivity in anticipation of and/or in response to, the given event. The IHS may then pre-load the ranked applications, ranked in order of most to least priority, into a cache memory until the memory budget (M) has been completely allocated.

The steady-state data collection and operation routines, upon execution, may also perform a knapsack constrained optimization algorithm as follows: MAXIMIZE sigma (responsiveness_score) across chosen applications so that sigma (mem_util) across chosen apps with knobs desired<M, where each application is pre-loaded with preselected knobs or settings. In some cases, the pre-loading of applications may be performed and managed with respect to a RAMDisk memory, a cache memory, etc. using otherwise well-known methods to unload, flush cache etc.

Still referring to FIG. 3, method 300 includes receiving, within loop 301, context information and events 303 from contextual inputs 302, and transforming those events and context information 303 into contextual inputs 305 via telemetry plug-in module 304. Data lake 306 stores contextual inputs 305 and provides data lake ingest 307 to off-box training server 308 (e.g., a remote server). In some cases, off-box training server 308 may be configured to rank applications by priority, at least in part, based upon historical user context information and system context information, for example, using an ML algorithm or the like.

Off-box training server 308 may then provide recommendation 309 (e.g., similar to the aforementioned data structure or JSON schema) to OS service 310 (e.g., application optimizer 201) executed by IHS 100. OS service 310 waits to detect an event 311 (e.g. an upcoming calendar meeting or conference) and, in response to detecting the event 311, uses recommendation 309 to pre-load selected applications using the constrained optimization or knapsack technique. For example, method 300 may flush cache 314, and then pre-load those applications 315 onto cache 313.

To better illustrate method 300, consider a first use-case where John is about to host a recurring meeting in a particular conference room at a particular time of day. He generally needs video conferencing, a specific learned document processor file for the meeting that he uses to write action items/notes, and also presentation files that are also learned as commonly used and sent out to other participants the previous evening. In this case, as long as John has set appropriate maximum memory budget for preloading purposes, that these contexts (applications and settings) can be preloaded in memory for faster responsiveness.

In a second use-case, assume John is in same user case as in the first case, but this time he starts a new memory hungry application before the meeting. In this case, the amount of memory left over for John to have preloaded context is less. For example, let us assume that he has enough memory only for two of the three apps in recommendation 309. Accordingly, only the two applications with highest priority are pre-loaded into cache in anticipation of the meeting (e.g., the video conferencing and word processing applications), and a presentation application may be loaded last and/or manually by the user.

Accordingly, systems and methods described herein may be used to provide one or more software services that learn, adapt, and pre-load applications and/or context to maximize a user's perception of responsiveness without sacrificing performance, for example, in constrained memory budget scenarios. These techniques may be trigger/event-based, and/or may be executed continuously or periodically, to save resource consumption (e.g., battery power) based on any suitable combination of context information discussed herein.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution by the processor, cause the IHS to:
  receive a ranked list of applications from the remote server, wherein the ranked list comprises, for each given application: (i) one or more associated settings, (ii) a responsiveness score representative of a metric inversely proportional to a time it takes to load the given application with the one or more associated settings, and (iii) a memory utilization value representative of an amount of memory it takes to load the given application with the one or more associated settings;
  select a memory budget for pre-loading applications;
  prior to the pre-loading, select one or more applications from the ranked list and configure each selected application with a corresponding one or more associated settings identified in the ranked list to maintain a memory usage for the pre-loading below the memory budget; and
  pre-load the one or more applications into a cache memory.

2. The IHS of claim 1, wherein the memory budget indicates a percentage of total available memory manually selected by a user for the pre-loading.

3. The IHS of claim 1, wherein the program instructions, upon execution, further cause the IHS to collect user context information and system context information.

4. The IHS of claim 3, wherein the user context information comprises at least one of: an identity of a user, a time-of-day, a calendar event, a type of calendar event, an application currently under execution, a duration of execution of an application, a mode of execution of an application, a user's proximity to the IHS, or a user's gaze direction.

5. The IHS of claim 3, wherein the system context information comprises at least one of: a current location of the IHS, a current memory usage, a characteristic of a current network connection, a current power usage, an identification of a currently connected peripheral device, or a current IHS posture.

6. The IHS of claim 3, wherein the memory budget indicates a percentage of total available memory automatically selected for the pre-loading, at least in part, based upon the historical user context information and the system context information.

7. The IHS of claim 3, wherein to select the one or more applications, the program instructions, upon execution, further cause the IHS to:
transmit the user context information and the system context information to a remote server configured to rank applications by priority, at least in part, based upon historical context information and system context information.

8. The IHS of claim 1, wherein to select the one or more applications, the program instructions, upon execution, further cause the IHS to:
select a first highest ranked application having a first associated setting, a first responsiveness score, and a first memory utilization; and
in response to a total memory utilization satisfying the memory budget, select a second highest ranked application having a second associated setting, a second responsiveness score, and a second memory utilization.

9. The IHS of claim 8, wherein at least one of the first or second associated settings comprise an online mode or an offline mode.

10. The IHS of claim 8, wherein at least one of the first or second responsiveness scores comprises a metric inversely proportional to a time it takes to load the first or second highest application with the first or second associated setting, respectively.

11. The IHS of claim 8, wherein at least one of the first or second memory utilization comprises an amount of memory that it takes to load the first or second highest application with the first or second associated setting, respectively.

12. A hardware memory storage device having program instructions stored thereon that, upon execution by one or more processors of an Information Handling System (IHS), cause the IHS to:
receive a ranked list of applications from a remote server, wherein the ranked list comprises, for each given application: (i) one or more associated settings, (ii) a responsiveness score representative of a metric inversely proportional to a time it takes to load the given application with the one or more associated settings, and (iii) a memory utilization value representative of an amount of memory it takes to load the given application with the one or more associated settings;
select a memory budget for pre-loading applications;
prior to the pre-loading, select one or more applications from the ranked list and configure each selected application with one or more associated settings to maintain a memory usage for the pre-loading below the memory budget, wherein the one or more associated settings comprises at least one of: start in an online mode, start in an offline mode, or a number of web browser tabs with different web addresse; and
pre-load the one or more applications.

13. The hardware memory storage device of claim 12, wherein the program instructions, upon execution, further cause the IHS to:
transmit user context information and system context information to a remote server configured to rank applications by priority, at least in part, based upon historical user context information and system context information.

14. The hardware memory storage device of claim 13, wherein the program instructions, upon execution, further cause the IHS to:
select a first highest ranked application with a first associated setting, a first responsiveness score, and a first memory utilization; and
in response to a total memory utilization satisfying the memory budget, select a second highest ranked application with a second associated setting, a second responsiveness score, and a second memory utilization.

15. The hardware memory storage device of claim 12, wherein the program instructions, upon execution, further cause the IHS to pre-load the one or more applications into a cache memory.

16. A method, comprising:
receiving a ranked list of applications from a remote server, wherein the ranked list comprises, for each given application: (i) one or more associated settings, (ii) a responsiveness score representative of a metric inversely proportional to a time it takes to load the given application with the one or more associated settings, and (iii) a memory utilization value representative of an amount of memory it takes to load the given application with the one or more associated settings;
selecting a memory budget for pre-loading one or more applications;
prior to the pre-loading, selecting one or more applications from the ranked list to maintain a memory usage for the pre-loading below the memory budget and configuring each selected application with one or more associated settings to maintain the associated memory usage with the selected application; and
pre-loading the one or more applications.

17. The method of claim 16, further comprising:
transmit user context information and system context information to a remote server configured to rank applications by priority, at least in part, based upon historical user context information and system context information.

18. The method of claim 16, further comprising:
selecting a first highest ranked application with a first associated setting, a first responsiveness score, and a first memory utilization; and
in response to a total memory utilization satisfying the memory budget, selecting a second highest ranked application with a second associated setting, a second responsiveness score, and a second memory utilization.

19. The method of claim 16, wherein pre-loading the one or more applications comprises pre-loading the one or more applications into a cache memory.

* * * * *